United States Patent [19]

Shepodd et al.

[11] Patent Number: 6,110,397
[45] Date of Patent: Aug. 29, 2000

[54] POLYMER FORMULATIONS FOR GETTERING HYDROGEN

[76] Inventors: Timothy J. Shepodd, 330 Thrasher Ave.; William R. Even, Jr., 4254 Drake Way, both of Livermore, Calif. 94550

[21] Appl. No.: 09/294,631

[22] Filed: Apr. 19, 1999

Related U.S. Application Data

[63] Continuation-in-part of application No. 09/182,405, Oct. 29, 1998.

[51] Int. Cl.[7] .............................. H01J 7/18; H01J 35/20; B01J 31/00; H01K 1/56; C01B 3/50
[52] U.S. Cl. ................................... 252/181.6; 252/181.1; 252/184; 423/248; 502/151; 502/159
[58] Field of Search ............................ 252/181.6, 181.1, 252/181.7, 184, 70, 188.28, 181.2; 423/248, 230, 245.1, 226; 502/151, 159

[56] References Cited

U.S. PATENT DOCUMENTS

| | | | |
|---|---|---|---|
| 3,896,042 | 7/1975 | Anderson et al. | 252/184 |
| 3,963,826 | 6/1976 | Anderson et al. | 423/248 |
| 4,405,487 | 9/1983 | Harrah et al. | 252/194 |
| 4,512,721 | 4/1985 | Ayers et al. | 417/51 |
| 4,886,048 | 12/1989 | Labaton | 165/104.27 |
| 5,624,598 | 4/1997 | Shepodd et al. | 252/182.12 |
| 5,703,378 | 12/1997 | Shepodd et al. | 252/182.12 |
| 5,998,325 | 12/1999 | Shepodd | 502/151 |

OTHER PUBLICATIONS

Fieser, L.F., Fieser, M., *Textbook of Organic Chemistry*, D.C. Heath & Co., 1950 pp. 66–69 and 89.

Kim, Y.S., Monforte, F.R., "Theoretically Dense (99.9%) Polycrystalline Alumina Prepared from Cryochemically Processed Powders," American Ceramic Society Bulletin, vol. 50, No. 6 Jun. 1971, p. 532–535.

Mirkovich, V.V., Wheat, T.A., "Use of Liquid Nitrogen In Spray Freezing," American Ceramic Society Bulletin, vol. 49, No. 8 Aug. 1970, p. 724–725.

Kelly, J., Hibbert, D.B., Tseung, A.C.C., "A critical examination of cryochemical method for the preparation of high surface area semiconducting powders," J. Mat. Sci., vol. 13, 1978 p. 1053–1060.

*Primary Examiner*—Joseph D. Anthony
*Attorney, Agent, or Firm*—Timothy P. Evans

[57] ABSTRACT

A novel method for preparing a hydrogenation composition comprising organic polymer molecules having carbon—carbon double bonds, for removing hydrogen from the atmosphere within enclosed spaces and particularly from atmospheres within enclosed spaces that contain air, water vapor, oxygen, carbon dioxide or ammonia. The organic polymers molecules containing carbon—carbon double bonds throughout their structures, preferably polybutadiene, polyisoprene and derivatives thereof, intimately mixed with an insoluble noble metal catalyst composition. High molecular weight polymers may be added to the organic polymer/catalyst mixture in order to improve their high temperature performance. The hydrogenation composition is prepared by dispersing the polymers in a suitable solvent, forming thereby a solution suspension, flash-freezing droplets of the solution in a liquid cryogen, freeze-drying the frozen droplets to remove frozen solvent incorporated in the droplets, and recovering the dried powder thus formed.

16 Claims, 5 Drawing Sheets

R/F18D
53% KRO3
10% Budene 1207
37% Pd on C (1% Pd)
From dioxane

• Channels throughout
• Surface not very porous

POLYMER FORMULATIONS FOR GETTERING HYDROGEN

CROSS REFERENCE TO RELATED APPLICATIONS

The present application is a Continuation-in-Part of co-pending U.S. patent application Ser. No. 09/182,405, filed Oct. 29, 1998 now allowed, entitled POLYMER FORMULATION FOR GETTERING HYDROGEN, from which priority is claimed under 35 USC §120.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

This invention pertains generally to methods of removing hydrogen and its isotopes from various atmospheres within enclosed spaces and particularly to the use of novel organic polymer formulations combined with hydrogenation catalysts, as absorbers of hydrogen and its isotopes.

In many applications the presence of hydrogen and its isotopes, arising from various chemical and electrochemical corrosion reactions, can be detrimental. Hydrogen can evolve from corrosion by atmospheric gases; corrosion generated by stray electric currents; from electronic devices, which can include batteries, operating in normal or abnormal condition; corrosion in heat exchangers; and from leaky hydrogen piping. Besides presenting a significant fire and/or explosion hazard, particularly in sealed components, hydrogen has a high thermal conductivity for a gas and can foul an insulating vacuum more rapidly than any other gas. Hydrogen can also react with many substrate materials significantly altering their physical and chemical properties. Mechanical and electrical safety devices, such as pressure relief valves, can be expensive, unreliable, and, particularly for small devices, not always practical. In the case of heat exchangers, the accumulation of hydrogen within the heat exchanger causes the thermal insulating and transfer properties of the heat exchanger to degrade over time.

It has long been known that hydrogen absorbing materials, known as getters, can be used to counteract hydrogen accumulation. Ayers, et al., discuss the use of active metals such as zirconium or titanium, and alloys thereof, in U.S. Pat. No. 4,512,721. These metals are capable of maintaining low hydrogen partial pressures but have the disadvantage of requiring high temperatures for initial activation and/or ongoing operation because of the necessity to diffuse surface contaminants into the bulk metal thereby providing a fresh surface for continued hydrogen absorption.

Labaton, in U.S. Pat. No. 4,886,048, describes another means for removing hydrogen by reacting the hydrogen with oxygen to form water, in the presence of a noble metal catalyst such as palladium, and trapping the water on a water absorbing material such as a molecular sieve. However, hydrogen getters of this type are expensive, bulky, limited by the availability of oxygen, and capable of causing a detonation if improperly formulated.

Conventional hydrogen getters, such as those described in the above-referenced patents, are expensive, can require special operating conditions such as high temperature regimes or ancillary reactants in order to maintain low hydrogen partial pressures, generally will not work well or at all in the presence of water, may require the presence of oxygen, or may be poisoned by oxygen, and may pose a significant safety hazards, including fire and explosion if handled improperly.

It is well known in the art that unsaturated carbon—carbon bonds (i.e., double or triple bonds between carbon atoms) can be reduced by hydrogen and its isotopes in the presence of an appropriate catalyst to form an alkane (see, for example, Fieser, L. F. and Fieser, M., Textbook of Organic Chemistry, D. C. Heath & Co. 1950, pp. 66–69 and 86). Anderson et al. in U.S. Pat. Nos. 3,896,042 and 3,963, 826 and Harrah et al. in U.S. Pat. No. 4,405,487 disclose the use of solid acetylenic compounds (i.e., organic compounds having carbon—carbon triple bonds) combined with various Group VIII metal catalysts to irreversibly remove hydrogen over the temperature range −50° C. to 110° C. Shepodd et al., in U.S. Pat. Nos. 5,624,598 and 5,703,378, and in co-pending U.S. patent application Ser. No. 09/182,405, discloses acetylenic hydrogen getters suitable for use at temperatures above 100° C., preferably from about 125° C. to 200° C. Finally, Shepodd, et al., in co-pending U.S. patent application Ser. No. 09/182,405, as well as U.S. Pat. Nos. 5,624,598 and 5,703,378, herein incorporated by reference, disclose compositions for gettering hydrogen. In these getter compositions, a polymer compound having multiple unsaturated hydrogen bonds is mixed with a hydrogenation catalyst, typically a metal selected from Group VIII of the Periodic Table, preferably palladium, platinum, or rhodium, although other catalysts are possible. When exposed to hydrogen or its isotopes, the unsaturated carbon—carbon bonds are irreversibly converted to their hydrogenated analog with the aid of the associated catalyst. Consequently, the reaction can be carried out in a vacuum, or in a liquid, and is unaffected by the presence of normal atmospheric gases or water.

The thermodynamics of hydrogenating unsaturated carbon—carbon bonds in an organic compound by means of a catalyst greatly favors the saturated compound. Thus, these heterogeneous reactions are substantially irreversible under typical hydrogenation conditions. Furthermore, for hydrogenation of an unsaturated carbon—carbon bond to take place it is necessary not only that the hydrogen gas but also the catalyst that mediates the reaction be proximate the unsaturated bond. Where small organic molecules are used, such as 1,4-diphenylbutadiyne or 1,4-bis(phenylethynyl) benzene, the required association can take place relatively easily in comparison with polymer molecules that are the preferred species of organic compound for use in a hydrogen getter composition, because of the higher concentration of reaction sites per molecule. In larger polymer molecules, generally the reactive association between hydrogen gas, the unsaturated carbon—carbon bond in the organic molecule, and the catalyst can only take place with difficulty, if at all.

Relative motion between the catalyst molecules and the organic molecules in a hydrogen getter can be considered in two different contexts. One is viscous flow, wherein the entire formulation, organic getter and catalyst, itself, flows. In the other, motion of the organic molecules themselves within the getter formulation causes various unsaturated portions of an organic molecule to come into contact with hydrogen gas and the hydrogenation catalyst contained in the catalyst composition. In many applications, viscous flow is undesirable and binders or other viscous flow inhibiting agents can be added to the getter formulation to immobilize it. On the other hand, molecular motion, allowing reactive association between the unsaturated bonds in the organic compound and the hydrogenation catalyst, is critical to the efficient functioning of an organic hydrogen getter. Long chain polymer molecules having a plurality of reactive sites (i.e., unsaturated carbon—carbon bonds) per molecule are preferable as the organic constituents of an organic hydrogen getter and polymer molecules having triple bonds within their structure are particularly preferred since they have twice the hydrogenation capacity of double bonds. Therefore, it will be appreciated that polymer molecules having a plurality of carbon—carbon triple bonds are the most desirable materials for use in a hydrogen getter. However, these materials are uncommon, expensive, and can react with common atmospheric gases such as water vapor and oxygen. Furthermore, their restricted mobility vis-à-vis interactions with the catalyst argue against their use.

The efficacy of hydrogen getters, however, is both judged by its rate and its capacity for scavenging hydrogen. Rate, capacity, or both, therefore, are important parameters when judging hydrogen getters in any given application The best hydrogen getters remove hydrogen rapidly and maintain the lowest concentration of hydrogen in the overgases.

The reaction rate for hydrogen removal depends on many factors, but in general is proportional to temperature, hydrogen pressure, diluent gas concentrations, catalyst concentration, and the ability of new hydrogen acceptor molecules to come into contact with catalyst and hydrogen. Furthermore, the ability of hydrogen to come into contact with a new acceptor molecule is related to the permeability of the media carrying these molecules and the available surface area of the supported catalyst.

For polymeric systems, raising the molecular mass and/or the viscosity of the polymer can inhibit both the reaction rate and the ultimate capacity of the getter. On the other hand, the use of a high molecular weight additives (reactive or unreactive to hydrogen) aid in the processability of the composition and, more importantly, provides a greater high temperature operational limit owing to their higher viscosities. This can be particularly important as operating temperatures increase since waste heat rejection is typically quite low for these getters and the added heat of reaction of the hydrogenation process simply compounds the problem.

Unfortunately, conventionally processed reactive getters modified with even small amounts of high-molecular-weight additive yields getters with significantly slower reaction rates towards hydrogen. A balance must be struck, therefore, between a highly reactive getter (using low molecular weight, low viscosity polymers that can react rapidly and completely) and a less reactive getter (using higher molecular weight and/or more viscous polymers that react more slowly but can be processed, handled, and used over a larger temperature range).

What is desired, therefore, is a hydrogen getter incorporating long chain polymer molecules, having a plurality of unsaturated carbon—carbon double bonds, that is inexpensive, and readily available, is unaffected by common atmospheric gases, and will function efficiently in the presence of high concentrations of water vapor, oxygen, carbon dioxide, ammonia, or liquid water. Furthermore, it is desired that the hydrogen getter be provided in a form such that it is capable of rapid and effective hydrogen removal and is easily handled and deployed.

SUMMARY OF THE INVENTION

The organic hydrogen getter system disclosed herein provides a novel solution to the problem of maintaining low partial pressures of hydrogen and its isotopes in various atmospheres and particularly, for ensuring a uniform and controlled reaction between the organic reactant and hydrogen in the presence of oxygen, thereby promoting safe and efficient hydrogenation in an oxygen containing atmosphere. Further, the organic hydrogen getter system disclosed herein has significant advantages over conventional hydrogen getter systems, namely, low risk of fire or explosion, no requirement for high temperature activation or operation, the ability to absorb hydrogen even in the presence of contaminants such as common atmospheric gases, water vapor, carbon dioxide, ammonia, liquid water, and oil mists. Moreover, if oxygen is present, the organic getter system of the present invention provides both a heat sink as well as a diluting medium to control the potentially explosive reaction between hydrogen and oxygen.

The present invention then, is directed to the use of organic polymers containing carbon—carbon double bonds throughout their structures, preferably polybutadiene, polyisoprene, and functionalized derivatives thereof, intimately mixed with an insoluble noble metal catalyst composition, preferably Pd supported on carbon.

More particularly, in this invention, we describe a processing methodology that allows sufficiently high-molecular-weight and/or high-viscosity additives to be incorporated into the getter to allow degassing and hydrogen absorption at temperatures up to nearly the $T_g$ of the additive without the dramatic reaction rate decreases observed in getters from conventional processing.

Figure 3:
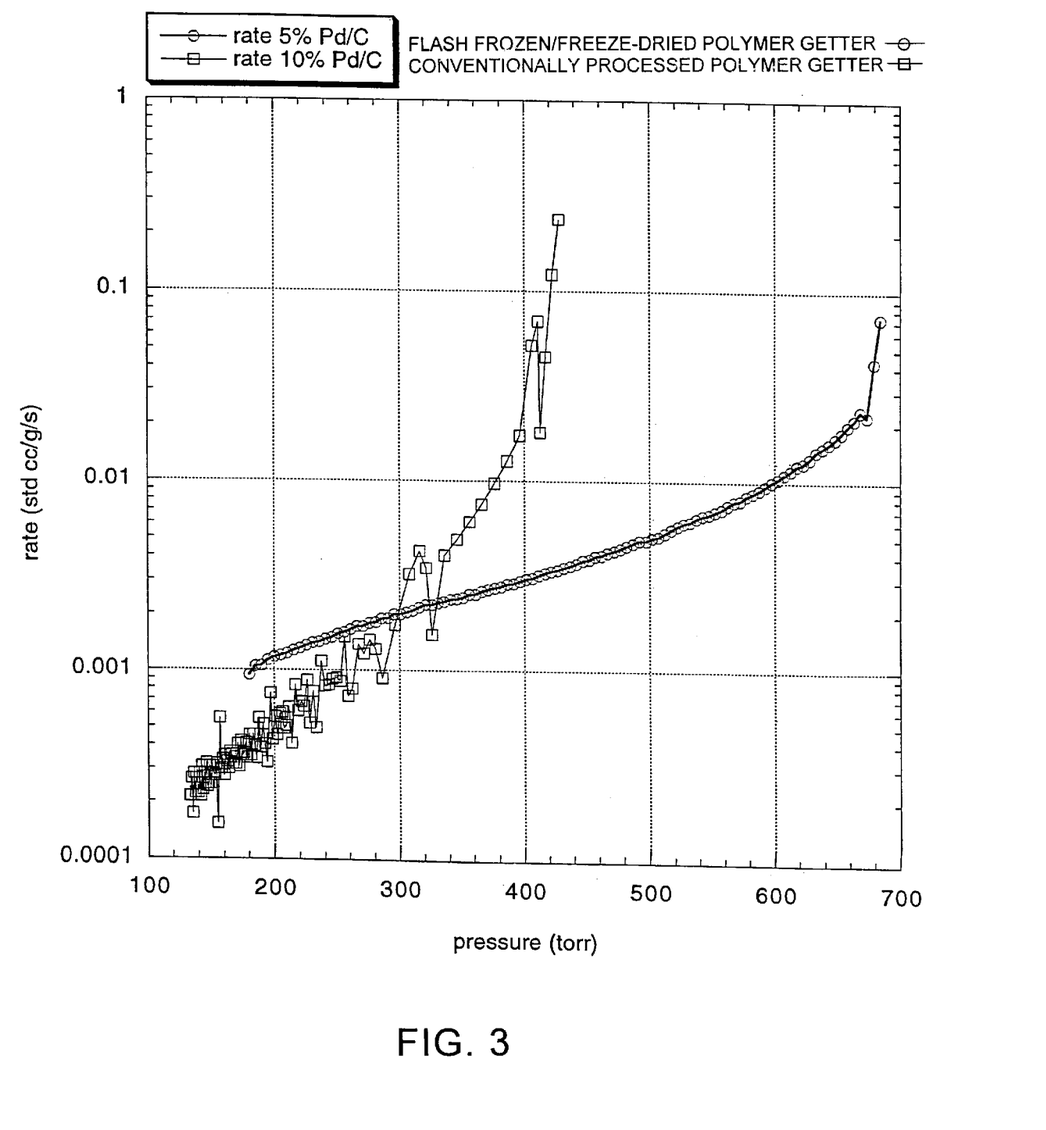
FIG. 3 illustrates a comparison of the hydrogen gettering rate capability and ambient pressure between a conventional hydrogen getter and one prepared by the instant process.

Additionally, in getters without additives, this invention yields dramatically increased gettering at low gettering pressures. For example, a getter processed as by the method of this invention is 2–3 times faster at scavenging hydrogen than a conventionally processed getter which uses twice the catalyst. As seen in FIG. 3 the getter of the instant invention remains above $10^{-3}$ stdcc $g^{-1}$ $s^{-1}$ at ambient hydrogen pressures of about 200 torr. By way of contrast, a conventional getter exhibits a getter rate which is increasingly degraded as hydrogen pressure falls below 200 torr. At which point the its rate is only about $4 \times 10^{-4}$ stdcc $g^{-1}$ $s^{-1}$. The ability to demonstrate greater reaction rates using half the catalyst, therefore, is a remarkable improvement on existing technology and allows for the economic deployment of many new getters.

The present invention, therefore, is drawn to a novel method for providing the catalyst composition comprising a large percentage of high molecular weight polymer having carbon—carbon bonds, in a dry powder or pelletized format. More particularly, the process is directed to providing a catalyst which is a dry, free flowing powder aggregate having a controlled range of size distribution and a qualitatively larger effective reaction surface than conventional getters.

Finally, while this invention describes a process that produces hydrogen getters having enhanced reaction rates for gas scavenging at low pressures, other gases can be gettered equivalently by minor modifications to the formulations described below. Other gases that could be scavenged are oxygen, ammonia, acid gases (HCl, HBr, etc.), sulfur dioxide, carbon dioxide, formaldehyde, phosphine, and phosgene.

DETAILED DESCRIPTION OF THE INVENTION

The present invention is directed to a novel process for providing a free flowing "dry" pelletized catalyst composition for removing hydrogen and its isotopes from the atmosphere within enclosed spaces and particularly from atmospheres within enclosed spaces that contain oxygen, carbon dioxide, or ammonia. The instant process uses the hydrogen catalyst described in co-pending patent application Ser. No. 09/182,405 comprising organic polymer molecules having a plurality of carbon—carbon double bonds and which is herein incorporated by reference.

Figure 1:
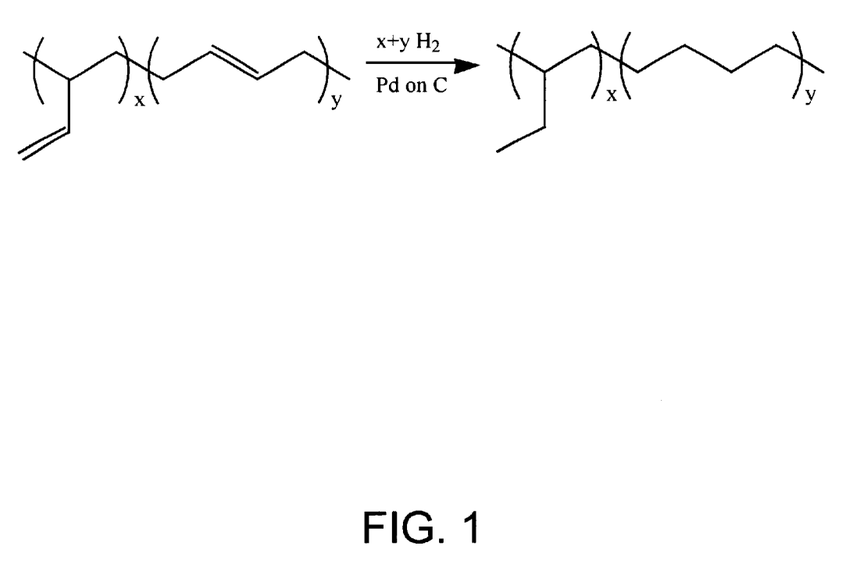
FIG. 1 illustrates the hydrogenation of a polymer molecule containing carbon—carbon double bonds.
Figure 2:
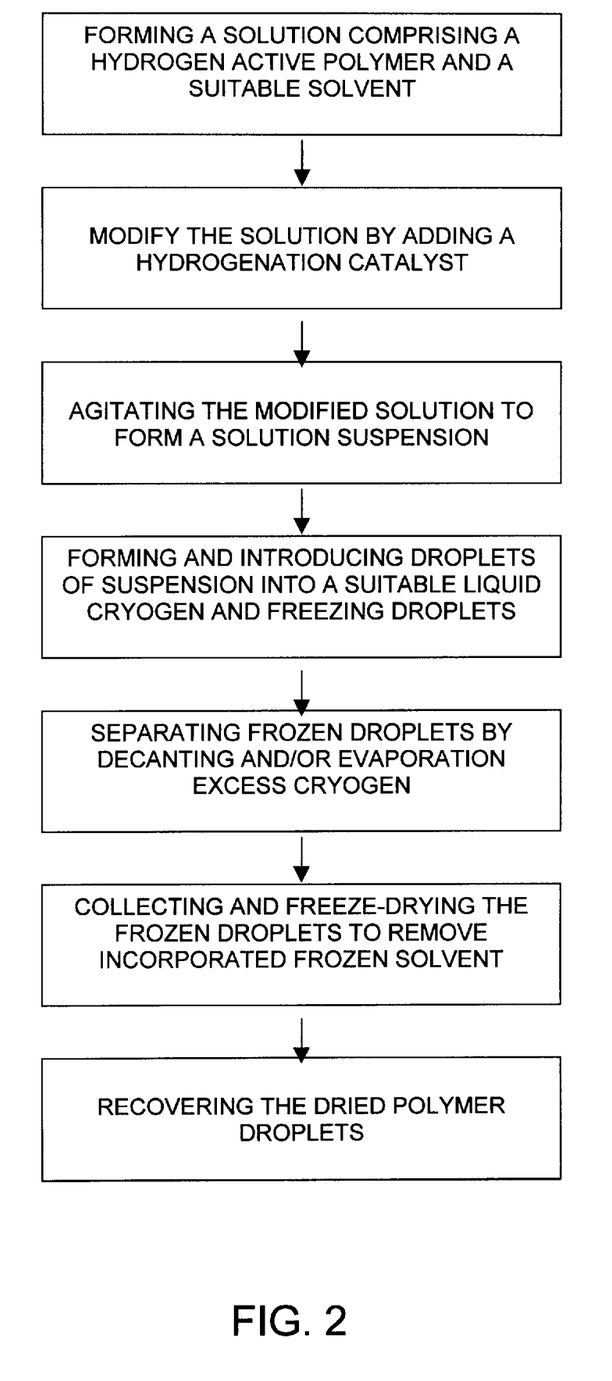
FIG. 2 illustrates the steps of the instant process as a block diagram

Hydrogenation of a carbon—carbon double bond in an organic compound by means of a catalyst, as illustrated in FIG. 1, is typically an irreversible, exothermic, heterogeneous reaction. That is, hydrogenation (the addition of hydrogen to at least one unsaturated carbon—carbon bond) takes place at the boundary between the hydrogenation catalyst and the organic reactant. Consequently, in order to achieve the highest degree of effectiveness, the getter materials should preferably be prepared using techniques that ensure that the hydrogenation catalyst is in reactive association with the unsaturated carbon—carbon bonds of the organic reactant compound. The preferred method is to dissolve the organic reactant in a suitable solvent, such as pentane or petroleum ether, adding a catalyst composition, e.g., a hydrogenation catalyst, preferably palladium, fixed on an inert substrate that can be carbon, diatomaceous earth or asbestos or inorganic minerals or salts, evaporating the solvent and drying the resulting powder. Getter materials can also be prepared by mixing an appropriate catalyst composition with a liquid organic material that can be produced by melting the organic compound. Inert fillers such as minerals or carbon can also be blended in to mitigate hydrogenation rate or for processability. The getter material, thus prepared, may then be converted into a powder or appropriate for its ultimate use by the process described below.

The heterogeneous nature of organic hydrogen getters causes a distribution of reaction sites that react at different rates. While in principle, the getter will not stop reacting until all the unsaturated carbon—carbon bonds have been hydrogenated, in practice, the rate becomes vanishingly small as the getter approaches saturation. Furthermore, for hydrogenation of an unsaturated carbon—carbon bond to take place in an organic hydrogen getter it is necessary not only that the hydrogen gas but also the hydrogenation catalyst that promotes the reaction be proximate the unsaturated bond(s). Thus, in addition to ensuring that the catalyst is distributed as uniformly as possible throughout the organic hydrogen getter, it is necessary to provide for movement of the organic getter molecules such that as many as possible of the unsaturated bonds in the organic molecule are brought into reactive association with a hydrogenation catalyst. While this is relatively easy to accomplish for small organic molecules it is extremely difficult for long chain polymer molecules. Incorporation of enough hydrogenation catalyst for each unsaturated bond in a long chain polymer molecule would be prohibitively expensive and would reduce the capacity of the getters.

Long chain organic polymer molecules having multiple carbon—carbon double bonds have hydrogen absorption capacities (measured as the amount of hydrogen that can irreversibly react with each gram of getter) comparable to the more conventional organic hydrogen getter molecules such as 1,4-phenylbutadiyne (444 std cc/g), or 1,4-bis (phenylethynyl)benzene (322 std cc/g) used in conventional organic hydrogen getters. By way of example, the homopolymer polybutadiene has a theoretical capacity for hydrogen absorption of 378 std cc/g. The inventors have discovered that by employing a long chain organic polymer molecule having a low glass transition temperature ($T_g$), such as polybutadiene, it is possible to formulate an organic hydrogen getter that possesses a high capacity for hydrogen absorption as well as a high hydrogenation efficiency. Having a low $T_g$ endows the polymer molecule with fluid-like properties that permit movement of the polymer molecule itself, thereby bringing unsaturated bonds in the molecule into reactive association with the hydrogenation catalyst to provide for hydrogenation of the unsaturated bond. Lower molecular weight polymer chains that can move more rapidly to a catalyst site demonstrate enhanced reactivities.

It will be appreciated that hydrogen and oxygen can form explosive mixtures over a concentration range of about 6 vol % to about 70 vol % $H_2$. A high temperature source such as a spark or flame can initiate an explosive reaction of this gas mixture. Noble metal hydrogenation catalysts, especially when heated can also initiate ignition of a hydrogen/oxygen gas mixture within the explosive concentration range. Two reactions occur simultaneously during the course of hydrogenating the unsaturated bonds in an organic polymer in the presence of oxygen. One is the combination of hydrogen and oxygen in the presence of a catalyst to make water. The second is the hydrogenation of the carbon—carbon double bonds in the polymer. The generation of heat, with the consequential heating of surrounding materials, occurs when hydrogen and oxygen combine rapidly and exothermically in the presence of a catalyst and as a consequence of the hydrogenation of the unsaturated carbon—carbon bonds in a organic polymer molecule. If a means to control the reaction rate is not provided, such as that described in the present invention, detonation of the hydrogen/oxygen mixture can take place. The inventors have discovered that in addition to the ability to absorb hydrogen, the fluid polymers of the present invention have an additional advantage in that they can moderate the explosively rapid reaction that can take place between hydrogen and oxygen, in the presence of a catalyst, making a detonation unlikely. It is believed that the unsaturated polymers of this invention allow safe removal of hydrogen from $H_2/O_2$ mixtures because hydrogenation of the unsaturated carbon—carbon double bonds provide a competitive reaction to the potentially explosive $H_2/O_2$ combination reaction. Furthermore, the getter material provides a heat sink to prevent localized overheating, and a diluting medium to restrict access of hydrogen and oxygen to the catalyst thereby slowing the $H_2/O_2$ reaction.

In addition to functioning as an efficient hydrogen getter in hydrogen/oxygen atmospheres, the inventors have discovered that the hydrogen getters of the present invention also function efficiently to remove hydrogen from hydrogen atmospheres, from hydrogen/inert gas atmospheres (He, Ar, $N_2$, etc.), hydrogen/ammonia atmospheres such as may be encountered in heat exchangers, and from hydrogen/carbon dioxide atmospheres. Water vapor and common atmospheric gasses have no adverse effect on the ability of these getter materials to absorb hydrogen. Liquid water does not have an adverse effect on the efficiency of these getters except that the reaction with hydrogen can be limited by the rate at which such hydrogen can diffuse through the liquid water to the getter material.

Because the hydrogenation of unsaturated carbon—carbon bonds can be highly exothermic, provision must be made, in some cases, for efficient removal of the heat of reaction from the hydrogen getter materials. Materials such as inert powders, or preferably excess catalyst composition, may be added to the getter compound to assist in removing excess heat generated by the hydrogenation reaction.

Getter formulations require the proper concentration of hydrogenation catalyst for optimum performance. Additional catalyst will speed the reaction but reduce the capacity per given mass of formulated getter. Too little catalyst will increase the ultimate capacity per given mass of formulated getter to absorb hydrogen, but may slow the reaction or reduce its efficiency such that not all of the stoichiometric capacity will be used. Changing the hydrogenation catalyst or the composition of the unsaturated organic compound requires careful evaluation of the proper catalyst concentration in order to optimize reaction rates vs. the capacity needed and the cost of the catalyst in a particular application. Preferably, about 5–75 weight percent (wt %) of a catalyst composition that comprise about 0.1–10 wt % noble metal hydrogenation catalyst (preferably Pd) is most effective for hydrogenating the polymers of the present invention for a variety of different conditions. In those instances where the catalyst is also intended to function as a heat sink to moderate rapid exothermic hydrogenation, the catalyst composition concentration may be raised to higher values preferably less than about 95 wt %.

Fillers that are inert with respect to reaction with hydrogen can perform many functions and be included in the hydrogen getter formulation in many forms. The simple addition of inert polymers, thixotropic agents, minerals, or carbon powders will mediate the reaction rate, act as a heat sink, and modify the physical properties of the getter.

The present invention now will be described more fully hereinafter by way of various examples illustrative of the invention. This invention may, however, be embodied in many different forms and should not be construed as limited to the embodiment set forth herein.

EXAMPLE 1

8 g of inhibitor-free polybutadiene was dissolved in 14 g of pentane in a reaction vessel. The catalyst, 3 g of 1% Pd on C, and 9 g carbon black was added and the three components swirled to make a slurry. This slurry was stirred vigorously and the solvent was allowed to evaporate. Final traces of solvent are removed from the getter using a vacuum oven (<1 torr at 75° C.) until the sample has been dried to a constant mass. The black rubbery getter is isolated from this procedure in 100% yield and has a stoichiometric hydrogen capacity of 166 std cc $H_2$/g. Depending upon the application, the getter may be powdered or pressed into pellets.

EXAMPLE 2

17 g of polybutadiene/polystyrene copolymer (20 wt % styrene) dissolved in petroleum ether was combined with 30 g of 5% Pd on carbon catalyst and vigorously mixed. The solvent was removed using a rotary evaporator then the getter was dried under vacuum (<1 torr) to constant mass. The resulting getter is isolated in 100% yield as a black powder having a theoretical hydrogenation capacity of 120 std cc $H_2$/g.

EXAMPLE 3

5.1 g of hydroxyterminated polybutadiene were dissolved in 30.5 g of an inhibitor free 35 wt % polybutadiene in pentane solution. 2.5 g of carbon powder, 2.5 g of 1% Pd on carbon, and 5.1 g of polybutadiene maleic anhydride homopolymer were sequentially mixed into the polybutadiene/pentane solution. To cross-link the anhydride and alcohol functionalities, 0.6 g of a catalyst (Emicure, EMI-24) was stirred into the mixture. After 30 minutes at room temperature, the remaining pentane was removed under vacuum. A porous rubbery black solid having a theoretical uptake capacity of 325 std cc $H_2$/g was produced.

EXAMPLE 4

6.0 g of cis-polyisoprene solution (15 w% in pentane) was mixed vigorously with 9 g of 5% Pd on carbon and the solvent removed under vacuum to yield a black rubbery powder having a theoretical hydrogenation capacity of 132 std cc $H_2$/g.

The following examples illustrate the process of hydrogenation of the hydrogen getter materials prepared as described above. For convenience, these experiments are terminated after the majority of the hydrogen has reacted. In all cases, the getter was still actively reacting with hydrogen when data collection was terminated. However, as shown hereinbelow, the reaction rate decreases markedly as the hydrogenation reaction nears completion.

It should be noted that some of the hydrogenations in the following examples involve explosive mixtures of hydrogen and air (oxygen). As is well known to those skilled in the art, extreme caution and appropriate shielding should always be used if there is any potential through the course of an experiment to generate a potentially explosive hydrogen mixture.

Hydrogenation in Air

EXAMPLE 5

3.1 g of a hydrogen getter pellet, prepared from the material described in EXAMPLE 1, was placed in a reactor containing 3.6 psia of laboratory air at 20° C. Hydrogen gas (241 stdcc, 47% of the theoretical hydrogenation capacity) was then added to the reactor. The reactor was maintained at room temperature and the pressure drop monitored for 950 minutes at which time most of the hydrogen had reacted. Two reactions occurred simultaneously during the course of this experiment. One was the catalytic combination of hydrogen and oxygen to make water. The second was the hydrogenation of the carbon—carbon double bonds in the polymer. Separate hydrogenation rates for each reaction were not quantified from this experiment, but overall rates based on pressure drop yield general information about the removal of hydrogen. The final proportionate disposition of the hydrogen as water or hydrogenated polymer is calculated as discussed below. Calculated reaction rates, based on pressure measurements, are shown below:

| Time (min.) | Reaction Rate (std cc/g-h) |
|---|---|
| 0–100 | 28.0 |
| 200–300 | 2.2 |
| 800–900 | 0.78 |

When oxygen is present, the catalytic combination of oxygen with hydrogen to form water is usually faster than hydrogenation of carbon—carbon double bonds. If catalytic water formation were the only reaction occurring in this experiment, the oxygen could consume 96 stdcc $H_2$ representing a 2.1 psi pressure drop. The total pressure drop of 3.2 psi shows that polymer must have been hydrogenated also.

Nuclear Magnetic Resonance (NMR) analysis can be used to quantify polymer hydrogenation. NMR analysis of the polymer before and after the experiment confirms that about 25% of the carbon—carbon double bonds were hydrogenated and demonstrates that the pressure drop solely due to polymer hydrogenation is approximately 1.9 psi. When the experiment was stopped approximately 70% of the hydrogen was incorporated into the polymer (representing 25% of the hydrogenation capacity) and 30% was converted into water.

EXAMPLE 6

5.1 g of a hydrogen getter prepared from a mixture of the polymers described in EXAMPLES 1 and 2 was placed in a reactor. This getter had a hydrogenation capacity of 122 stdcc $H_2$/g. A mixture of hydrogen gas (307 stdcc, 49% of the theoretical capacity) and air (3.6 psia) was then added to the reactor. The reactor was maintained at room temperature and the gas pressure was measured for 2000 minutes. Calculated instantaneous reaction rates, based on pressure measurements, are shown below:

| Time (min.) | Reaction Rate (stdcc/g-h) |
|---|---|
| 0–10 | 107.0 |
| 0–20 | 71.0 |
| 1000–1500 | 0.1 |

About 80% of the hydrogen was incorporated into the polymer (representing 22% of the hydrogenation capacity) and the remainder converted into water.

EXAMPLE 7

4.1 g of a sample prepared as detailed in EXAMPLE 3 was placed in reactor containing 3.5 psia air. Hydrogen gas (239 stdcc, 18% of the theoretical hydrogen capacity) was added to the reactor and the pressure monitored. Calculated reaction rates, based on pressure measurements, are shown below:

| Time (min.) | Reaction Rate at 20° C. (stdcc/g-h) |
|---|---|
| 0–10 | 6.1 |
| 200–400 | 1.9 |
| 900-1000 | 0.31 |

Hydrogenation in an Inert Atmosphere

EXAMPLE 8

2.5 g of a hydrogen getter prepared as described in EXAMPLE 1 were placed in a reactor containing 3.6 psi helium. Hydrogen gas (310 stdcc $H_2$, 74% of the theoretical hydrogen capacity) was then added to the reactor and the pressure monitored for 24 hours. Calculated hydrogen reaction rates, based on pressure measurements, are shown below:

| Time (min.) | Reaction Rate (stdcc H2/g-h) |
|---|---|
| 0–100 | 3.5 |
| 200–300 | 2.3 |
| 800–900 | 1.1 |

The experiment was stopped when 33% of the hydrogen had reacted representing 24% of the theoretical capacity of the getter sample. Nuclear Magnetic Resonance (NMR) analysis of the polymer before and after the experiment confirms that about 25% of the carbon—carbon double bonds were hydrogenated.

Hydrogenation in a Hydrogen Atmosphere

EXAMPLE 9

1.0 g of the getter prepared in EXAMPLE 2 were placed under vacuum to remove adsorbed gases then exposed to hydrogen (121 stdcc, 106% of the theoretical hydrogen capacity) while the pressure was monitored. The reactor remained at 20° C. for 90 minutes and then was heated to 47° C. and equilibrated for 10 minutes whereupon the reaction rate increased. After measuring the rates at elevated temperature, the reactor was cooled to 20° C. and the experiment was continued until terminated after a total of 1400 min. Calculated hydrogen reaction rates, based on pressure measurements, are shown below:

| Time (min.) | Reaction Rate at 20° C. (stdcc H2/g-h) |
|---|---|
| 0–20 | 74.0 |
| 60–80 | 3.1 |
| 100–110 | 75.0 |

At the conclusion of the test run the hydrogen getter adsorbed 71% of the theoretical hydrogen capacity.

EXAMPLE 10

1.6 g of the getter prepared as detailed in EXAMPLE 1 was exposed to 3.6 psia air and heated to 110° C. Hydrogen gas, (246 std cc, 95% of the theoretical hydrogen capacity) was added and after a short period of pressure increase (while the cool hydrogen equilibrated at 110° C.) the pressure dropped in a fashion similar to that observed in the other hydrogenation reactions. After approximately 1000 minutes the temperature was raised to 150° C. for 1 hour then the entire reactor was returned to room temperature. Calculated reaction rates, based on pressure measurements, are shown below:

| Time (min.) | Reaction Rate at 110° C. (stdcc/g-h) |
|---|---|
| 45–55 | 114.0 |
| 200–300 | 11.0 |
| 800–900 | 1.6 |

The total pressure drop was 5.1 psi. The polymer was hydrogenated to 76% of the hydrogenation capacity. Approximately 70% of the hydrogen went into the polymer and 30% was converted into water.

Deuteration in Air

EXAMPLE 11

1.1 g of a sample prepared as detailed in EXAMPLE 4 was placed in reactor containing 3.6 psia air. Deuterium gas (205 std cc, 145% of the theoretical deuterium capacity) was added to the reactor and the pressure monitored. Calculated reaction rates, based on pressure measurements, are shown below:

| Time (min.) | Reaction Rate (stdcc/g-h) |
|---|---|
| 1–11 | 262.0 |
| 190–310 | 1.0 |
| 800–1000 | 0.6 |

The total pressure drop in the experiment was 2.5 psi. More than 95% of the pressure drop occurred within 150 min. Polymer deuteration represented 40% of the pressure drop. Approximately equal amounts of deuterium were converted into deuterium oxide and deuterated polymer (representing 56% of the hydrogenation capacity).

Hydrogenation in Ammonia

EXAMPLE 12

3.9 g of a sample prepared as detailed in EXAMPLE 1 was placed in reactor containing 18.2 psia ammonia. Hydrogen gas (241 std cc, 38% of the theoretical hydrogen capacity) was added to the reactor and the pressure monitored. The experiment continued at 20° C. for 1000 min when the temperature was raised first to 55 then 90° C. The reaction rate increased at the higher temperature. Calculated hydrogen uptake rates, based on pressure measurements, are shown below:

| Time (min.) | Reaction Rate (stdcc $H_2$/g-h) |
|---|---|
| 10–110 | 4.6 |
| 500–600 | 1.0 |
| 1130–1160 | 6.6 (90° C.) |

The experiment was stopped when 76% of the hydrogen had reacted representing 28% of the theoretical capacity of the getter sample.

Hydrogenation in Carbon Dioxide

EXAMPLE 13

1.5 g of a sample prepared as detailed in EXAMPLE 1 was placed in reactor containing 7.0 psia carbon dioxide. Hydrogen gas (245 std cc, 97% of the theoretical hydrogen capacity) was added to the reactor and the pressure monitored. The experiment continued at 20° C. for 950 min when the temperature was raised to 48° C. The reaction sped up at the higher temperature. Calculated hydrogen reaction rates, based on pressure measurements, are shown below:

| Time (min.) | Reaction Rate (stdcc $H_2$/g-h) |
|---|---|
| 2–102 | 0.8 |
| 500–600 | 0.8 |
| 1100–1200 | 4.2 (48° C.) |

The experiment was stopped when 29% of the hydrogen had reacted representing 28% of the theoretical capacity of the getter sample.

Embodiment 2 The Polymer Hydrogen Getter as a Powder

Organic hydrogen getters such as those described above are prepared by conventional mixing (stirring, blending) of a polymer (hydrogen acceptor), a catalyst, and various additives. An intimate mixture yields contact between the hydrogen acceptor and the catalyst. Upon exposure to hydrogen, the carbon—carbon multiple bonds of the polymer irreversibly hydrogenate; thereby permanently removing the hydrogen from the surrounding atmosphere.

In contrast to the prior art, the instant invention embodies a process which involves: 1) dissolving the hydrogen active polymers in a solvent, 2) mixing the solution with a catalyst, 3) adding additives or diluents to modify the solvent/solute phase separations (these additives are intended to modify the end product's final physical/mechanical and/or chemical properties), and 4) introducing the liquid solution suspension as droplets into a cryogenic liquid where these droplets are quickly frozen. The frozen droplets of getter material take the form of small spheres whose size can be adjusted by changing the droplet size that falls into the cryogenic liquid. This size can be varied from very fine, by use of an ultrasonic spray nozzle, to fairly coarse by forcing the liquid through the end of a small bore tube such as a hypodermic needle.

The frozen beads of solution are then transferred to a vacuum chamber where the solvent is removed below the freezing point of the suspension by freeze-drying. Care is taken to avoid allowing the beads to warm and thaw.

Figure 4:
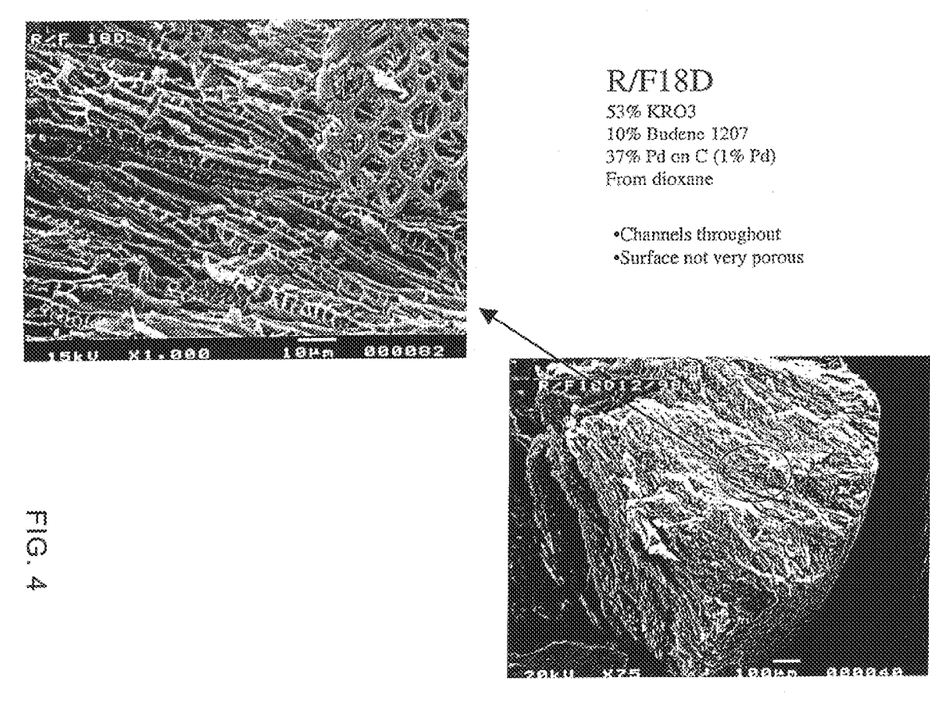
FIG. 4 is a photomicrograph of a typical fractured "bead" formed by the process of the instant invention.

Upon complete removal of the solvent, the getter is warmed to room temperature where it is ready for deployment. This rapid freezing process prevents segregation processes, provides a microporous substructure in the catalysis particles which, in turn, enhances hydrogen transport throughout the catalyst particle and thereby increases the efficiency of the catalyst for removing hydrogen. Microscopic observation FIG. 4 of a typical getter "bead" of the instant invention shows a sphere (deliberately fractured in order to expose the bead interior) which shows a surface having a high degree of channeling and a moderate degree of porosity encased by a discontinuous skin. This physical configuration is preserved through degassing, and throughout the reactive capacity of a given getter.

Finally, the choice of the solvent system use in this process is known to have a dramatic effect on the microporosity of the freeze-dried beads. The example described below used cyclohexane as a solvent. The particular parameters recited below are those specific to cyclohexane. Those skill in the art will recognize that many other solvents are useful in this capacity and that corresponding parameters are developed are a matter of routine experimentation.

EXAMPLE 14

Solution Preparation and "Flash" Freezing

In order to prepare a dry powder comprising a polybutadiene/Pd-on-carbon hydrogen getters, liquid suspensions utilizing an organic solvent such as cyclohexane are prepared. The solutions were ultrasonically agitated, through a process known in the art as "sonication," in order to suspend the solid materials. In particular, test solutions were sonicated, for 5 minutes in their transport vessels. Following sonication, portions of the solution were withdrawn quickly from the vial in 3 cc aliquots and immediately introduced into a large quantity of a liquid cryogen such as liquid nitrogen contained within a large mouth Dewar flask. Each portion of the solution was dispensed drop-wise through a 25 gauge needle which provided drops ~2 mm in diameter exiting the needle tip. As these drop entered the cryogenic bath each would freeze and sink to the bottom of the liquid nitrogen level within a few seconds.

The original solution suspension was re-sonicated between withdrawals and re-samples until the entire volume of liquid had been dispensed and frozen in the liquid nitrogen. The frozen beads of carbon/Pd, polybutadiene suspension were then recovered from the liquid nitrogen bath by decanting the Dewar just enough so as to leave a slight excess liquid nitrogen filling the interstitial space between each of the beads.

Powder Recovery

Immediately following decanting the liquid nitrogen, the frozen beads were prepared for freeze-drying. Several 100 cc plastic beakers were pre-cooled with liquid nitrogen. The free flowing collection of beads were divided between the pre-cooled containers in order to keep bead bed depth small (total volume of beads ~30 cc). The remaining liquid nitrogen was drained and the containers quickly transferred to a freeze drier. As with the containers, the freeze-drier shelves were pre-cooled to about −25° C. The drier condenser was set to run at about −75° C. Samples were pumped to a steady state pressure of about 70 mTorr ($10^{-3}$ Torr) for 24 hours in order to remove the frozen solvent incorporated into the frozen beads, by sublimation.

After the initial drying cycle, the shelf temperature in the drier was raised to about −10° C. and held for an additional 24 hours after which the system was checked by closing the chamber isolation valve. When this procedure resulted in little or no detectable change in pressure (i.e. evaporation rate was very small) the temperature was ramped, step-wise, to 0° C., to 10° C. and finally to room temperature over the next 24 hour period.

1.7 g of the hydrogen getter beads produced by the method of this application, were placed into a reactor chamber and degassed overnight. The dried beads were then exposed to a quantity of "neat" hydrogen sufficient to bring the reaction chamber to a pressure of about 700 torr at an ambient laboratory temperature of about 20° C. The chamber was then isolated by valving it off from the hydrogen reservoir and the pressure monitored. FIG. 3 illustrates the rate of hydrogenation of this sample versus pressure. (It should be noted that the instant sample is a 5% Pd catalyst while the comparison sample is a 10% Pd catalyst and that despite the low concentration of catalyst the instant sample exhibits a considerably greater hydrogenation activity at lower ambient pressures.) The reactor was maintained at room temperature and the pressure drop monitored for 950 minutes at which time most of the hydrogen had reacted.

Nuclear Magnetic Resonance (NMR) analysis of the polymer before and after the experiment confirms that about 92% of the sample was hydrogenated.

EXAMPLE 15

Getters Containing Additives

Five additional formulations containing various amounts of high molecular weight polybutadiene polymers, and butadiene-styrene co-polymers formulations ("HWP") were introduced as additive to the baseline low molecular weight polymer ("LWP"), wherein the polymers have average molecular weights above about 10,000 Daltons and wherein further said HWP have average molecular weights above about 1,000,000 Daltons. These formulations contained respectively, 5% LWP+50% HWP, 15% LWP+40% HWP, 45% LWP+10% HWP, 15% LWP'+40% HWP, and 15% LWP'+40% HWP, where LWP' and LWP" are slightly different molecular weight polybutadiene formulations. The balance of each formulation is a catalyst containing 5% Pd-on-carbon.

Figure 5:
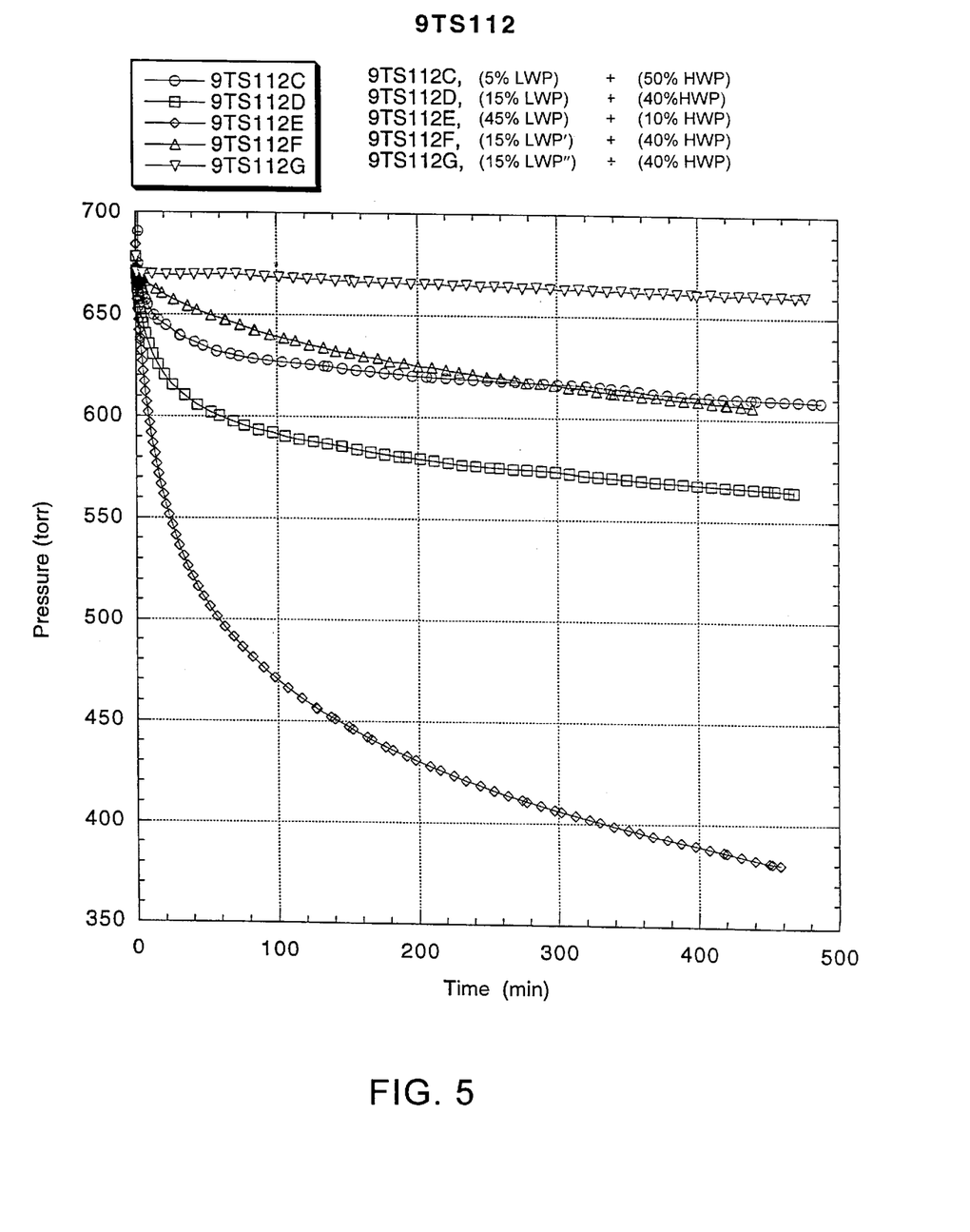
FIG. 5 illustrates a comparison of the hydrogen gettering capability of several getter formulations containing polymer additives as measured by pressure decay with time.

Each formulation was exposed to a "neat" hydrogen atmosphere of approximately 700 torr and the internal pressure monitored. FIG. 5 illustrates the different scavenging performance of each. Note that the tests were conducted at a laboratory ambient temperature of about 20° C. As might be expected that this temperature the formulation containing the lowest concentration of the high molecular weight additive removed hydrogen most rapidly. However, as noted above, as reactor temperatures increase, one can expect the reaction rate with hydrogen to increase until the beads comprising only the lower molecular weight polymer begin to "melt" and coalesce shutting down the required hydrogen transport in these catalyst formulation while those formulations containing the high molecular weight additives continue to operate.

From the foregoing description and examples, one skilled in the art can readily ascertain the essential characteristics of the present invention and recognize that the objects of the present invention are fulfilled. The description and examples are intended to be illustrative of the present invention and are not to be construed as limitations or restrictions thereon, the invention being delineated in the following.

What is claimed is:

1. A hydrogen catalyst powder made by the process comprising the steps of:
    a) mixing a hydrogen active polymer in a solvent medium to provide a polymer solution, said solvent capable of solvating said polymer, said polymer having a plurality of carbon—carbon double bonds
    b) adding a hydrogenation catalyst into said polymer solution, wherein said hydrogenation catalyst comprises;
        i) an insoluble noble metal catalyst for catalyzing the reaction between the organic polymer and hydrogen, and
        ii) an inert support material for carrying said metal catalyst;
    c) agitating said polymer solution to form a solution suspension;
    d) forming said solution suspension into a plurality of droplets and introducing said droplets into a quantity of a cryogenic liquid thereby rapidly freezing said droplets;
    e) separating said frozen droplets from said liquid cryogen; and
    f) freeze-drying said frozen droplets at a temperature and a pressure chosen for sublimating said frozen solvent, said sublimation removing said solvent from said drops and thereby providing said hydrogen catalyst powder, said hydrogen catalyst powder capable of removing hydrogen at a rate of greater than about $10^{-3}$ std cc/$g_{catalyst}$/sec at ambient pressures of hydrogen above about 200 torr.

2. A. The hydrogen catalyst powder of claim 1, wherein the hydrogen active polymer is selected from a group consisting of polybutadiene, polyisoprene, polybutadiene/polystyrene copolymer, the cured or crosslinked versions of said polymers, and combinations thereof.

3. The hydrogen catalyst powder of claim 1, wherein the metal catalyst is selected from the group consisting of palladium, platinum, rhodium and combinations thereof.

4. The hydrogen catalyst powder of claim 1, wherein the concentration of said hydrogenation catalyst in said hydrogen active powder is from about 5 weight percent to about 75 weight percent of said hydrogenation catalyst, and wherein further the hydrogenation catalyst contains about 0.1 weight percent to about 10 weight percent of said metal catalyst, based on the weight of the hydrogenation catalyst.

5. The hydrogen catalyst powder of claim 3, wherein the support material is a porous, inert solid.

6. The hydrogen catalyst powder of claim 5, wherein the porous, inert solid is activated carbon, aluminum oxide, barium carbonate or combinations thereof.

7. The hydrogen catalyst powder of claim 1, wherein said step of mixing further includes adding one or more inert additives to said polymer solution.

8. The hydrogen catalyst powder of claim 7, wherein the inert additives are high molecular weight polymers selected from the list consisting of polybutadienes, and polybutadiene/polystyrene copolymers, and combinations thereof, said polymer having an average molecular weight above about 1,000,000 Daltons.

9. A method for making a hydrogen catalyst powder comprising the steps of:
 a) mixing a hydrogen active polymer in a solvent medium to provide a polymer solution, said solvent capable of solvating said polymer, said polymer having a plurality of carbon—carbon double bonds;
 b) adding a hydrogenation catalyst into said polymer solution, wherein said hydrogenation catalyst comprises;
  i) an insoluble noble metal catalyst for catalyzing the reaction between the organic polymer and hydrogen, and
  ii) an inert porous support material for carrying said metal catalyst;
 c) agitating said polymer solution to form a solution suspension;
 d) forming said solution suspension into a plurality of droplets and introducing said droplets into a quantity of a cryogenic liquid thereby rapidly freezing said droplets;
 e) separating said frozen droplets from said liquid cryogen; and
 f) freeze-drying said frozen droplets at a temperature and a pressure chosen for sublimating said frozen solvent, said sublimation removing said solvent from said drops and thereby providing said hydrogen catalyst powder.

10. The method of claim 9, wherein the hydrogen active polymer is selected from a group consisting of polybutadiene, polyisoprene, polybutadiene/polystyrene copolymer, the cured or crosslinked versions of said polymers, and combinations thereof.

11. The method of claim 9, wherein the metal catalyst is selected from the group consisting of palladium, platinum, rhodium and combinations thereof.

12. The method of claim 9 wherein the concentration of said hydrogenation catalyst in said hydrogen catalyst powder is from about 5 weight percent to about 75 weight percent of said powder, and wherein further the hydrogenation catalyst contains about 0.1 weight percent to about 10 weight percent of said metal catalyst based on the weight of the hydrogenation catalyst.

13. The method of claim 9, wherein the support material is a porous, inert solid.

14. The method of claim 13, wherein the porous inert solid is selected from the list consisting of activated carbon, aluminum oxide, barium carbonate, and combinations thereof.

15. The method of claim 9, wherein said step of mixing further includes adding one or more inert additives to said polymer solution.

16. The method of claim 15, wherein the inert additives are high molecular weight polymers selected from the list consisting of polybutadienes, and polybutadiene/polystyrene copolymers, and combinations thereof, said polymer having an average molecular weight above about 1,000,000 Daltons.

* * * * *